United States Patent [19]

Brown et al.

[11] Patent Number: 5,321,579
[45] Date of Patent: Jun. 14, 1994

[54] OFFICE PANELLING SYSTEM WITH A MONITOR SCREEN MOUNTED ON A CANTILEVERED ADJUSTABLE ARM

[75] Inventors: Mortimer Brown, Oakville; Jonathan Crinion, Toronto, both of Canada

[73] Assignee: Teknion Furniture Systems, Downsview, Canada

[21] Appl. No.: 894,613

[22] Filed: Jun. 5, 1992

Related U.S. Application Data

[63] Continuation-in-part of Ser. No. 733,166, Jul. 19, 1991, abandoned.

[51] Int. Cl.⁵ .............................................. H05K 7/16
[52] U.S. Cl. .................................... 361/681; 248/282; 248/920; 312/223.3; 52/36.1; 52/36.5; 52/239; 174/48
[58] Field of Search ..................... 160/135; 248/225.1, 248/278, 279, 282, 917–923; 312/223.1, 223.3, 223.6, 7.2; 52/36, 220, 221, 238.1, 239, 36.1–36.6, 220.1–220.8; 174/48; 364/708, 708.1; 361/380, 390, 392, 393, 394, 395, 399, 415, 427–429, 681, 682, 724–727, 825; 358/254

[56] References Cited

U.S. PATENT DOCUMENTS

| 3,662,981 | 5/1972 | Hogrebe ........................ 248/278 X |
| 4,561,619 | 12/1985 | Robillard et al. ................... 248/285 |
| 4,685,255 | 8/1987 | Kelley ................................ 52/36 |
| 4,852,500 | 8/1989 | Ryburg et al. ................. 248/919 X |

FOREIGN PATENT DOCUMENTS

| 145410 | 6/1985 | European Pat. Off. ......... 312/223.1 |
| 256160 | 2/1988 | European Pat. Off. ......... 312/223.3 |
| 3003017 | 7/1981 | Fed. Rep. of Germany ...... 248/922 |
| 3120723 | 3/1983 | Fed. Rep. of Germany ... 312/223.1 |
| 3239371 | 4/1984 | Fed. Rep. of Germany ... 312/223.3 |

OTHER PUBLICATIONS

"Proceedings of the SCAR Conference", p. 864, (Part 2), Held at Langley Research Center, Hampton, Va., Nov. 9–12, 1976, copy dated Mar. 1977.

*Primary Examiner*—Leo P. Picard
*Assistant Examiner*—Michael W. Phillips

[57] ABSTRACT

The present invention is directed to office panelling systems and, in particular, an office panelling system wherein a flat electronic display screen is incorporated within or directly supported by an office panel, with the display screen visible to one side of the panel. The office panel with the display screen located therein greatly enhances the amount of work space available at an associated work station, which otherwise would have a CRT supported on the work surface. The depth of the work surface can be cut down if the work station is primarily used for a dedicated data entry station or computer work station. In other cases, the computer monitor screen is a flat thin profile screen mounted on an adjustable arm supported at a position adjacent the panel whereby the spacing of the screen from the panel is adjustable by varying the effective length of the arm.

13 Claims, 6 Drawing Sheets

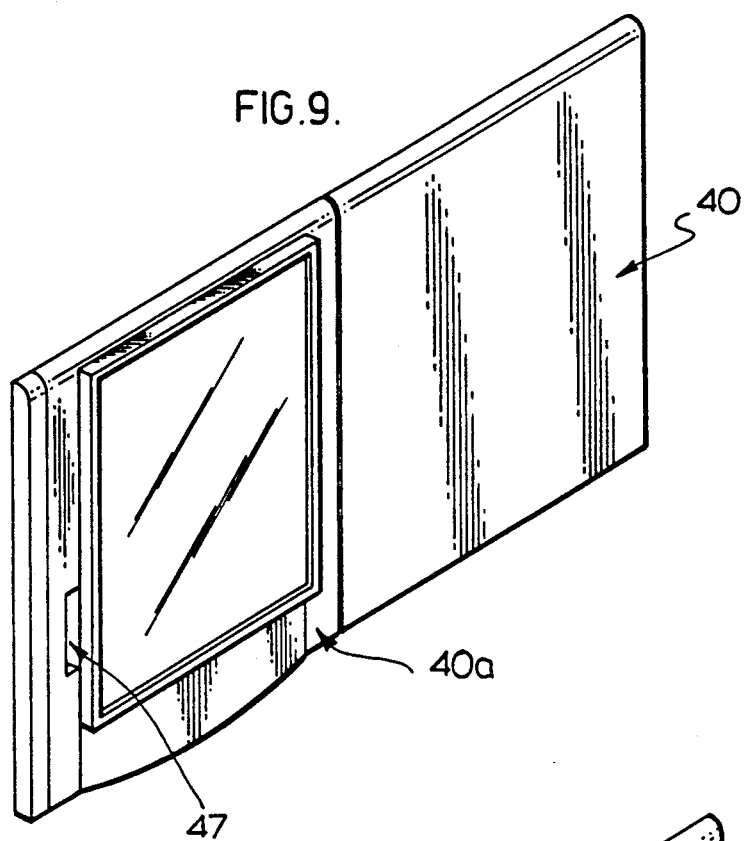
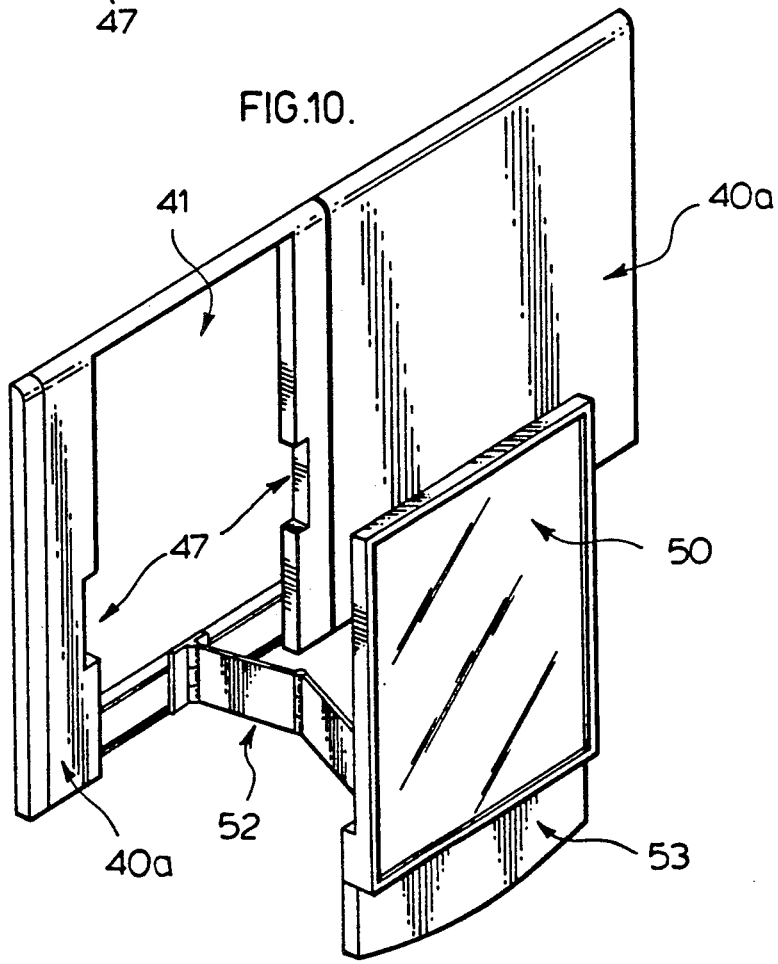

OFFICE PANELLING SYSTEM WITH A MONITOR SCREEN MOUNTED ON A CANTILEVERED ADJUSTABLE ARM

CROSS-REFERENCE TO RELATED APPLICATIONS

This application is a continuation-in-part of Ser. No. 73/733,166, filed Jul. 19, 1991, now abandoned.

FIELD OF THE INVENTION

The present invention relates to office panelling systems and, in particular, to office panelling systems having associated electronic display screens.

BACKGROUND OF THE INVENTION

Office panelling systems for subdividing of office space have become extremely popular due to their ability to rearrange the office space by reconfiguring the panels as required at different points in time. These free-standing office panels can have a host of accessories used to effectively define a work station or work area that is efficient and convenient to use by the operator. As can be appreciated, efficient office layout has become important when one considers the cost of rental space. Furthermore, the work station should fit the needs of the user to ensure high productivity in a safe environment.

Both the professional staff and the support staff in office environments now generally use, or have access to, personal computers or word processing stations, each of which has its own computer terminal. These terminals are typically cathode ray tubes and although the monitors may be fairly small, they still take up a considerable amount of the work space primarily due to the depth of the cathode ray tube. A number of arrangements have been proposed for supporting of these terminals above the work surface or to more effectively use the work surface about the display screen, but there is still a considerable amount of work surface occupied by the terminal itself.

Most office panelling systems have provided convenient access of power within the individual panelling system and one such system is shown in our U.S. Pat. No. 4,535,577. Each of the major office panelling systems have a host of accessories to allow effective use of the defined work environment.

There remains a need to provide a more efficient system which has more usable work space without increasing the size of the work station.

SUMMARY OF THE INVENTION

In an office panelling system having a multiplicity of discrete office panels interconnected to subdivide an open area in a particular manner and an associated work surface immediately in front of one of said panels, according to the present invention, the panel and associated work surface cooperate to define a work station. The work station includes a display monitor and a keyboard. The display monitor is supported in a cantilevered manner by an adjustable securing arm attached adjacent the panel above the work surface. The securing arm and the screen cooperate to position the screen at any position between a storage position immediately adjacent the panel to a forward position at least 12 inches in front of the panel and above said work surface. With this arrangement, an operator may freely adjust the position of the screen for a particular operator preference and may return the screen to a storage position immediately adjacent the panel to allow additional work surface utilization for other tasks when the screen is in the storage position.

In an office panelling system, according to the present invention, the system has a number of interconnected, free-standing panels with these panels generally being about five inches thick. The panelling system is equipped with a flat electronic display screen having a display surface which forms at least part of one of the panels. This display surface is visible to one side of the panel. The remaining portion of the display screen may be interior to the panel or closely associated therewith to effectively uses the space within the panel for receipt of part of the display screen or necessary electronic components thereof. In this way, the display screen forms part of the panel and the need for a separate standalone CRT on an associated work surface associated with the panel is avoided.

According to an aspect of the invention, the flat electronic display screen is a liquid crystal display screen.

According to a further aspect of the invention, the panelling system has an associated work surface immediately adjacent the panel with the display screen with a data entry device connected to the electronic display screen with the data entry device supported on the work surface. In this way, the work station has the data entry device, such as a keyboard, supported on the work surface with the remaining portion of the work surface being available for other purposes and the electronic display screen being an inherent part of the associated panel.

BRIEF DESCRIPTION OF THE DRAWINGS

Preferred embodiments of the invention are shown in the drawings, wherein:

FIGS. 9 and 10 are partial perspective views of an alternate embodiment; and

DETAILED DESCRIPTION OF THE PREFERRED EMBODIMENTS

Figure 1:
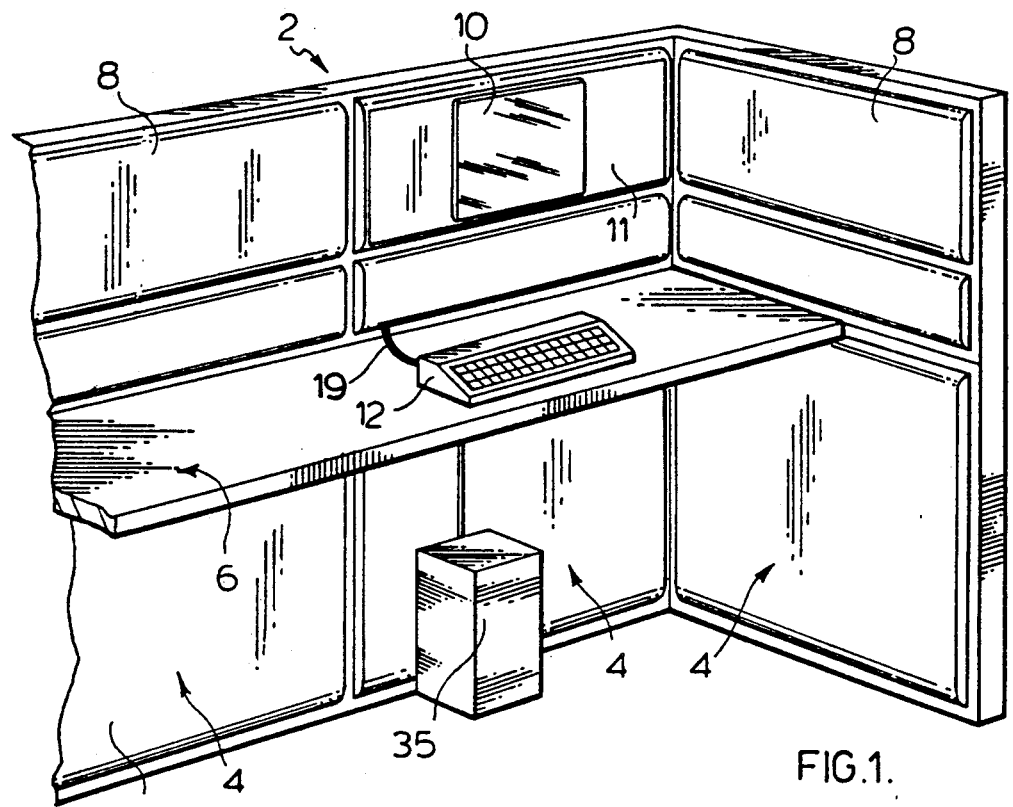
FIG. 1 is a partial perspective view of an office panelling system having a flat electronic display screen secured in one of the panels.

The office panelling system, generally shown as 2, has a number of interconnected free-standing individual panels 4. As shown in FIG. 1, a work surface 6 is associated with the free-standing panels 4. The free-standing panels have removable covers genera shown as 8. The overall thickness of the panels is less than 5 inches and normally is about 3½ inches thick.

One of the individual panels has had the normal cover removed and has a flat electronic display screen received in a specialized cover 11. The flat electronic display screen 10 could be a liquid crystal display, a gas plasma display screen or any other suitable flat, thin profile screen. Thin profile display screens are typically less than about 1 inch in depth. The specialized cover 11 is inserted in the office panelling system above the work surface preferably in a vertical surface. A data entry station generally shown as 12 is associated with the flat electronic display screen 10 and is electrically connected thereto by means of electrical cables 13. The data entry station 12, in this case a keyboard, is supported on the work surface 6 and allows data to be entered or programs adjusted with the results being shown on the flat electronic display screen 10. Thus, the flat electronic display screen 10 and the keyboard 12 form a work station suitable for word processing or other programming typical of a personal computer or an existing computer station. As can be appreciated, the normal cathode ray tube associated with a personal computer has now been replaced with the flat electronic display screen 10 which has been made an integral element of the office panelling system. As shown in the sectional view of FIG. 2, a portion of the electronic display screen 10 is enclosed within the panel, with this enclosed portion generally being designated 14. Thus, the interior of the office panel 4 is effectively used to house a portion of the flat electronic display screen 10 with the actual display surface of the display screen 10 exposed to one side of the office panelling system.

Figure 2:
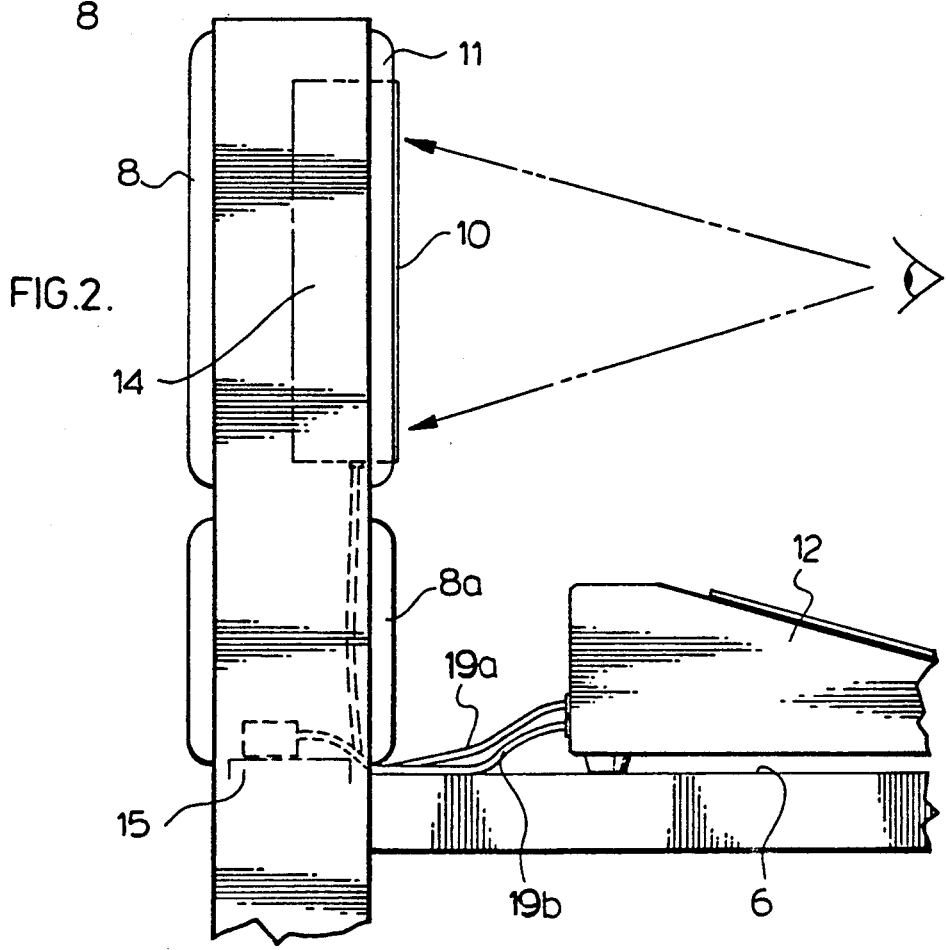
FIG. 2 is a partial side elevation showing the display screen and an associated data entry station.

The keyboard 12, as shown in FIG. 2, has cable 13a and 13b at the rear thereof which are connected to other elements in the cavity of the panel 4. Cover 8a is hinged at the top surface thereof to allow convenient access of the cables to the interior of the panel. Cable 13a is connected to the display screen 10 with cable 13b connected to a power outlet 15 connected to a power conduit therebelow.

Figure 3:
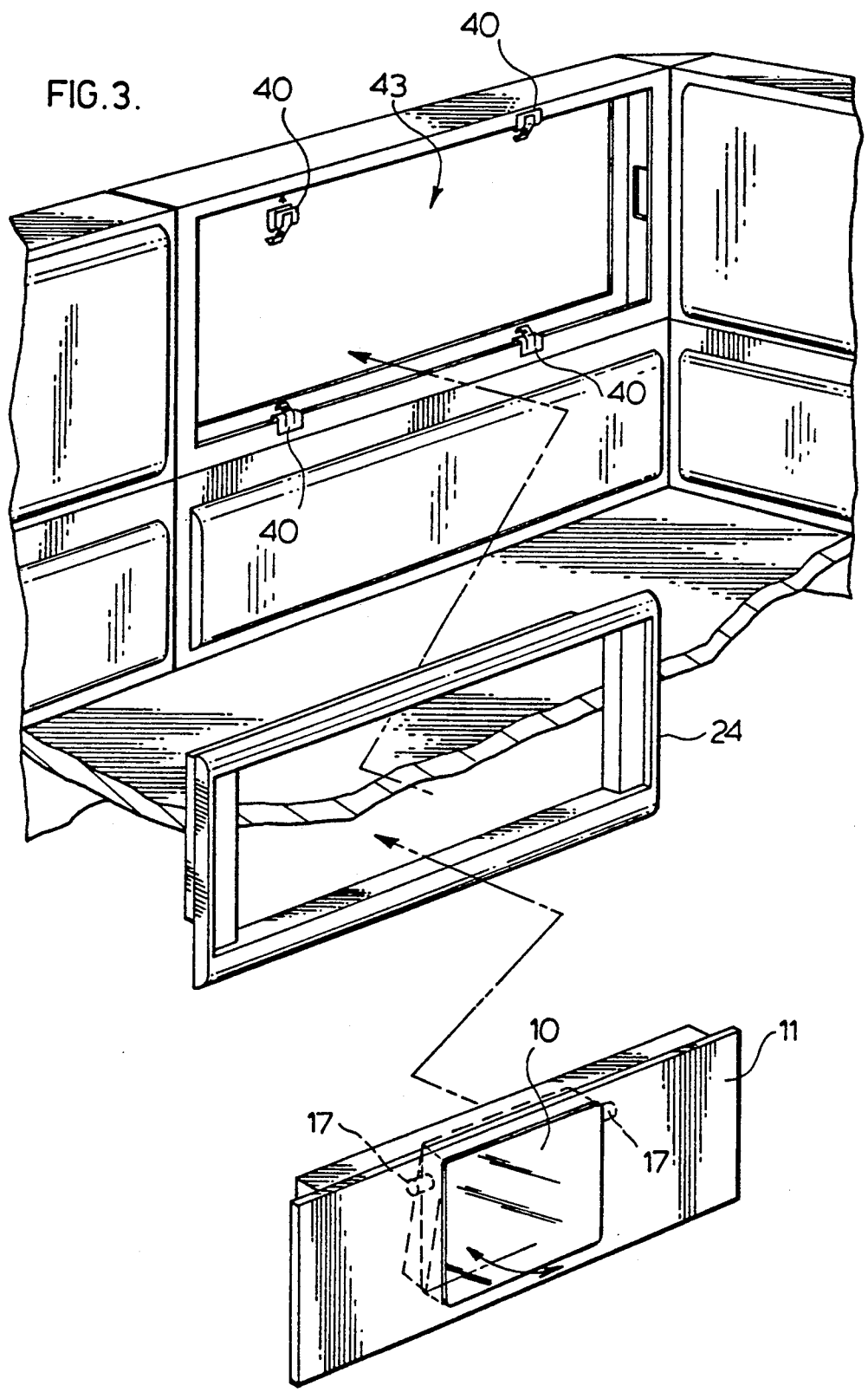
FIG. 3 is an exploded perspective view showing the mounting of an electronic display screen.

One particular method of mounting of the flat electronic display screen 10 is shown in FIG. 3. In this case, the flat electronic display screen 10 is mounted in a customized peripheral frame arrangement 24 which is designed to snuggly engage and protect the customized cover 11 including the display screen 10. This frame 24 is then secured within the office panelling system by removing of an existing cover and inserting of the frame 24, the customized cover 11 and display screen 10 in the panel as generally indicated in FIG. 3. Once so inserted, the electronic display screen 10 forms part of the office panelling system by forming an outer vertical planar section of the panel and also defines a viewing screen of a work station.

By incorporating the electronic display screen 10 into the office panelling system 2, significant space on the work surface 6 is available for other purposes, or in the case of a dedicated terminal, the depth of the work surface could be reduced. Securement of the electronic display screen 10 in the customized cover 11 accommodates angular adjustment of the flat electronic display screen 10, by limited pivotting action of the display screen 10 about the pivot mounts 17 securing the display screen within the customized cover 11. In this way, slight angular adjustment of the display screen 10 can be accomplished to eliminate such problems as glare from overhead lights or adjustment for differing heights of users. The portion of the specialized cover 11 either side of the display screen 10 can be covered in a material or finish corresponding to the other covers 8 or can be designed to complement the other covers 8.

Figure 4:
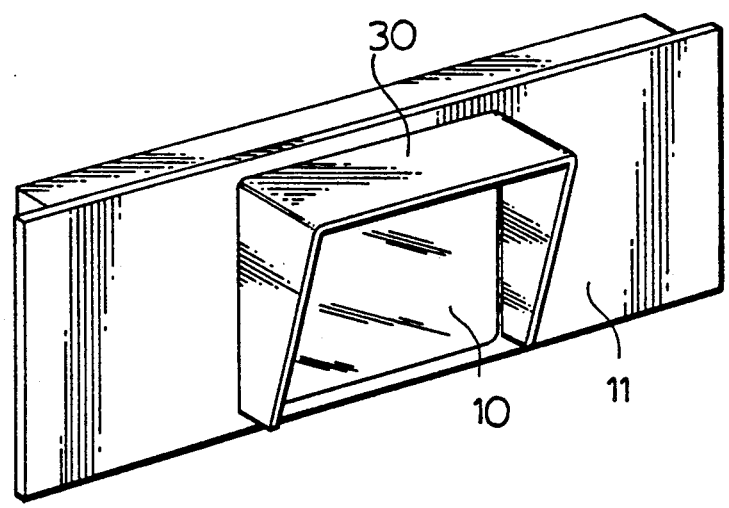
FIG. 4 is a perspective view of one panel having a shield thereabout.
Figure 5:
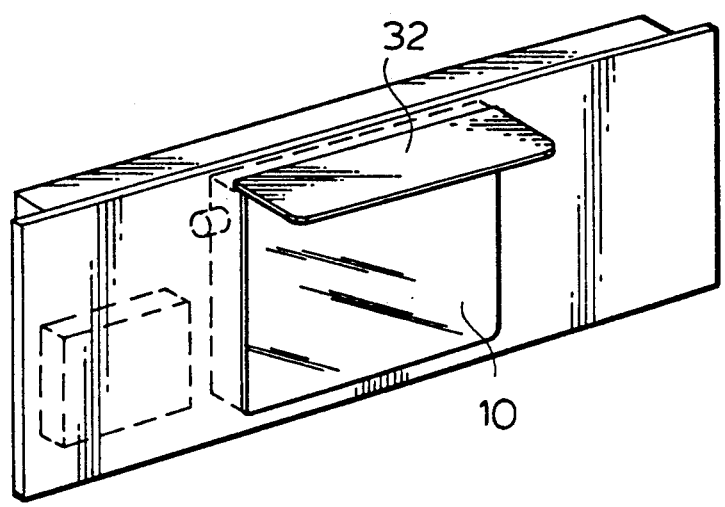
FIG. 5 is a perspective view of one panel having a pivotting screen mounted therein.

Other arrangements for reducing glare are shown in FIGS. 4 and 5. In FIG. 4, a hood 30 is provided about the display screen 10. In FIG. 5, a cap 32 projects outwardly from above the display screen to partially shade the display screen 10. In these cases the hood 30 or cap 32 can be added to the customized cover 11 or made an integral part thereof.

Figure 6:
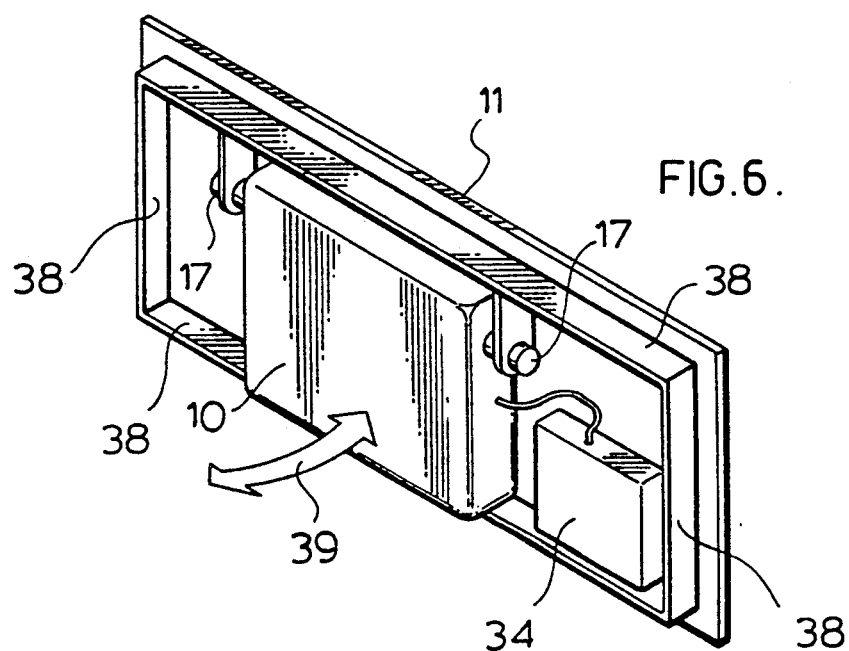
FIG. 6 is a rear perspective view of the screen of FIG. 5.

A review of FIG. 4 through 6 illustrates that typically the display screen 10 is of a width and height less than the cover which is replaced. As shown in FIG. 6 this additional space can accommodate associated electronics 34 of the display screen 10. Any one specialized cover 11 could also receive two or more flat electronic display screens 10, or display screens could be located to opposite sides of the panel.

The office panelling system 2 can include interior power conduits, as generally shown in FIG. 2 and as shown in our U.S. Pat. No. 4,535,577, whereby the power for the flat electronic display screen 10 and the data entry station 12 can be provided interior to the panelling system.

The specialized cover 11 shown in FIG. 6 has rearwardly projecting frame members 38 which are sized to snuggly engage the peripheral frame 24 shown in FIG. 3. These frame members also serve to support the pivotting mounts 17 allowing angulation of the screen as indicated by arrow 30. It is also possible to merely have spring clips 40, shown in FIG. 3, engaging the interior frame components of a panel, directly engage the customized cover 11 thereby eliminating the peripheral frame 24.

One particular arrangement for adjustably mounting of the electronic display screen has been described although other mounting arrangements can be used. For example the electronic display screen 10 could have a universal support within the customized cover 11 to allow angulation in all directions.

It can be appreciated from the above disclosure that an improved computerized work station is defined wherein the display screen of the computerized work station is incorporated in and forms part of an office panelling system. This arrangement takes advantage of the space within the panel and the power availability of the panel to suitably house a particular type of electronic display screen as well as satisfying the necessary screening function of the panelling system. Furthermore increased work space results due to the incorporation of the electronic display screen in the panel or, if desired, the depth of the work space may be reduced by up to about 12 inches.

Figure 7:
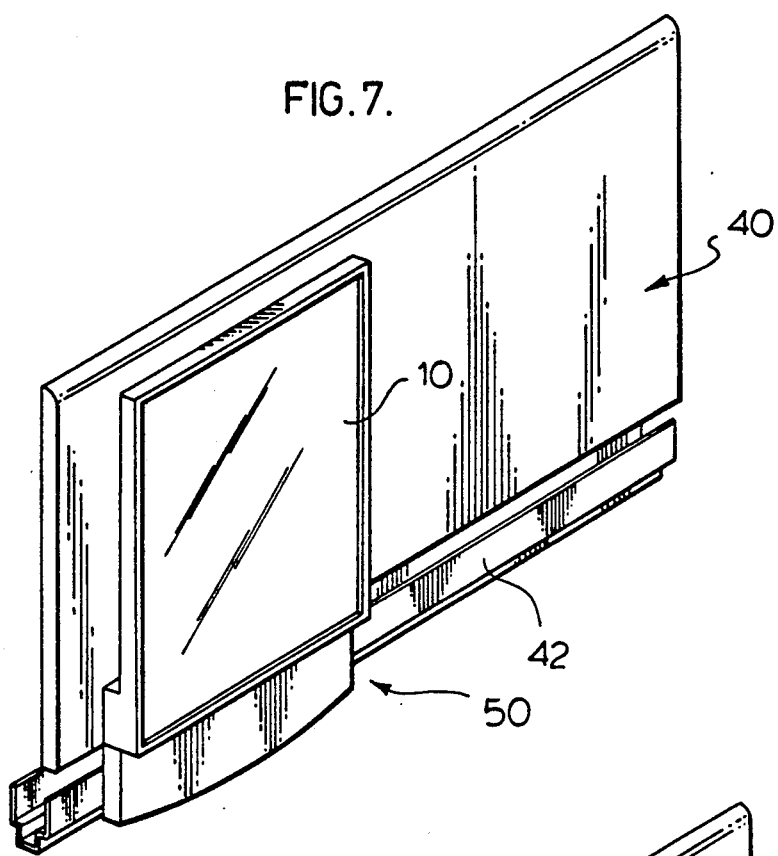
FIGS. 7 and 8 are partial perspective views of an alternate mounting arrangement.
Figure 8:
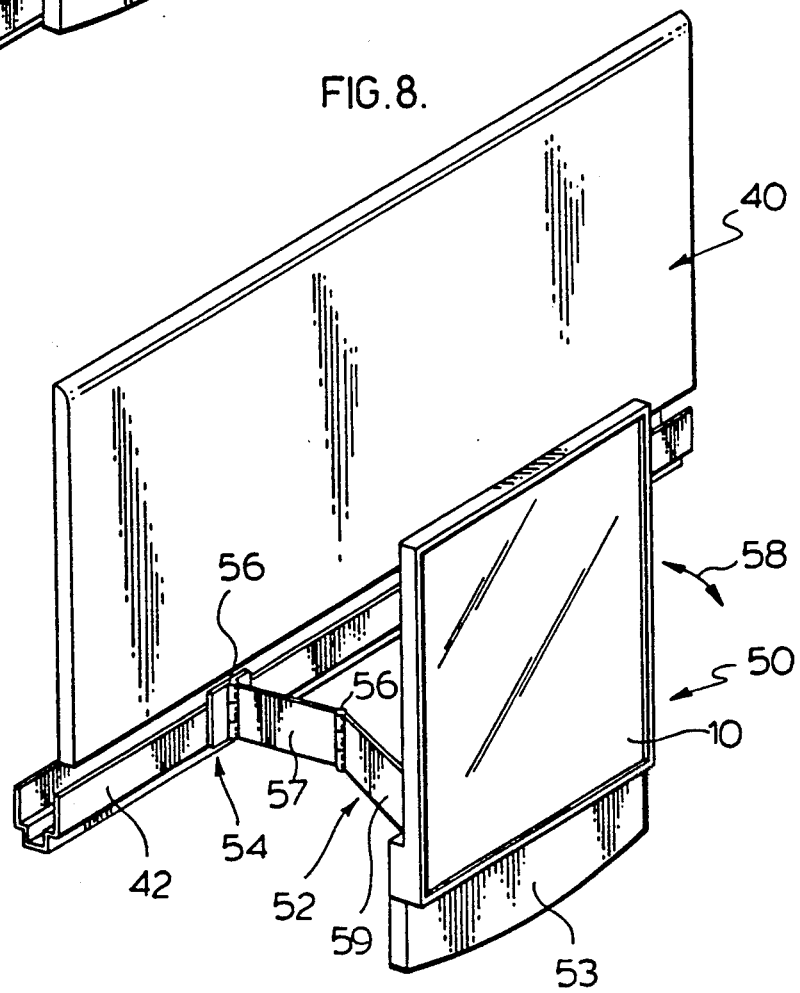
Figure 11:
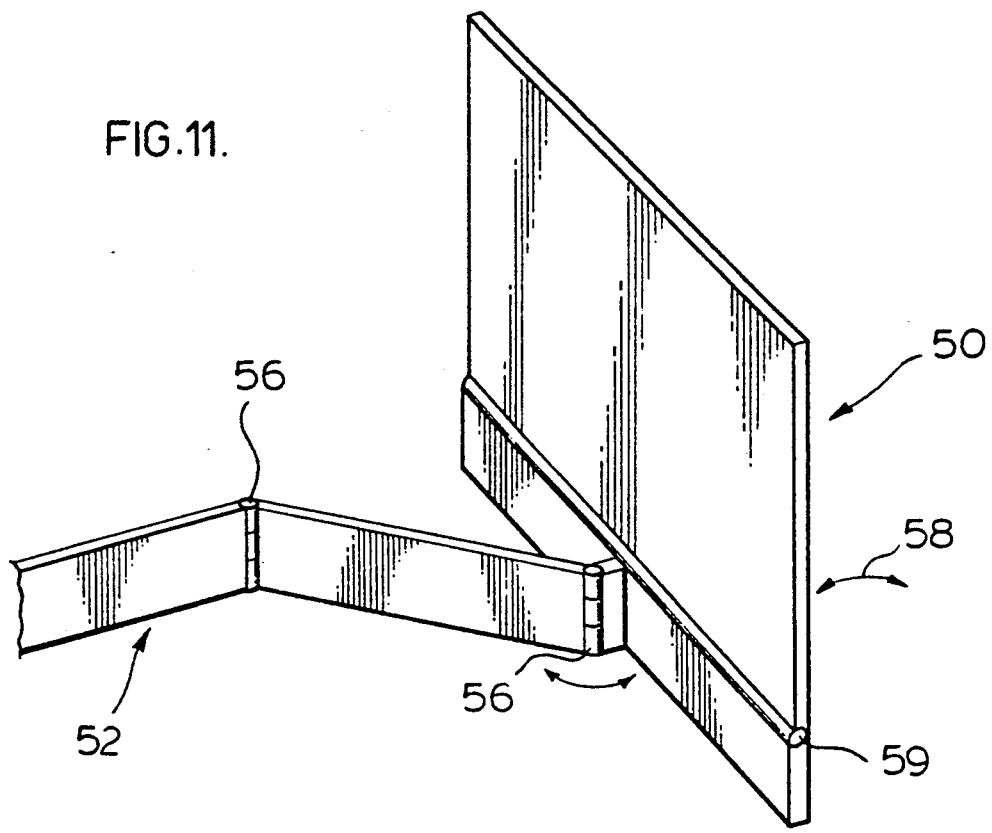
FIG. 11 is a partial perspective rear view of the securing arm and display screen.

FIGS. 7 through 10 illustrate a different embodiment where the flat display screen 50 is secured to a horizontal member 42 of the frame of an office panel. The various other structural elements of the frame are not shown, but are covered or essentially covered by the office cover elements 40. The rail 42 of the office panel frame is preferably accessible between vertically stacked panels to allow securement of the system without removal of the individual office cover elements 40. In FIGS. 7 and 8, the flat display screen 50 is movable from a storage position, as shown in FIG. 7 immediately adjacent the front of the office cover element 40, to an extended position, shown in FIG. 8. The movement between the storage position and the extended or forward position of FIG. 8 is accomplished by pulling on the flat display screen and thereby extending the adjustable support arm 52 which is of a bifold design. This adjustable support arm 52 is hingedly attached at 56 adjacent the rail 42 of the office panel frame and is hingedly secured intermediate its length at another hinge point 56 and is also hingedly secured immediately adjacent the flat screen to accommodate the bifold movement. In this way, the screen can stay aligned with its storage position as it is extended or can be moved to various positions possible due to the bifolded arm arrangement.

It is also possible to secure the adjustable arm to an accessory element secured to the panel frame. The accessory element may have a multiplicity of horizontal securing rails which the panel end of the adjustable arm can engage for positive securement to the panel frame. Any securement arrangement must be positive and capable of supporting the flat screen and arm at all positions. The extended position of the arm results in substantial load due partially to the cantilever support. It is also possible to have a separate element designed specifically to support the adjustable arm. Such an element could be a pass through element having a horizontal track for engaging one end and thereby supporting the adjustable arm.

As shown by arrows 58, the display screen 50 is also adjustable to accommodate a rearward tilting of the display screen 50 about hinge 59. This may be desirable to accommodate operators of different heights, in that the flat display screen is most easily recognized when the line of sight is generally perpendicular to the plane of the screen. This vertical adjustment can occur between the base 53 of the adjustable support arm 52 and the flat display screen 50 mounted thereabove. A simple limited hinge arrangement works satisfactorily. Preferably, this is a stiff hinge arrangement, such that when the screen is angled, it stays in position.

The same features are incorporated in the embodiment of FIGS. 9 and 10, however, in this case, a modified office panel element 40a is used which has a recess 41 therein for partially accommodating the depth of the flat display screen 50, the adjustable arm 52 and the base 53. In order to simplify movement of the flat display screen 50 from the storage position of FIG. 9 to an extended position, such as shown in FIG. 10, the recess 41 includes a notched-out area 47 in the recess 41 to allow access to the edge of the display screen 50 when placed in the storage position as shown in FIG. 9. In this way, the flat screen is partially accommodated within the office panel.

The flat display screen 50 requires an electrical connection with electronic processing apparatus which can be housed within the panel and this electrical connection can be flat ribbon type connection which moves in response to movement of the arm 52. In fact, the ribbon connection can be directly secured to or contained within the adjustable arm. This ribbon connection also accommodates electrical connection with the keyboard supported on a work surface in front of the panel having this movable display screen.

The adjustable arm is shown as comprising flat structural segments interconnected by hinges. The arm segments can be tubular with an open central passage for accommodating the ribbon connection, with the ribbon connection leaving the arm adjacent the flat screen and at the panel.

The adjustable arm 52 supports the flat display screen 50 in a cantilevered manner above a work surface and allows the user to adjust the forward position of the display screen to suit their particular needs. The method of mounting the adjustable arm 52 to the rail 42 of the frame of an office panel allows slide adjustment of the arm along the length of the support rail to a desired position which can subsequently be maintained. This provides the user with further flexibility in laying out his work space or to accommodate any changes in his environment. When the user is no longer using the computer, the flat display screen 50 may be moved to the storage position, thus freeing additional work space for other tasks. Even in the storage position, the user may make quick reference to the computer, as the screen would still be available. It is only for prolonged use that the user may find it more preferable to adjust the position of the screen for his particular convenience. The horizontal adjustability of the arm 52 on the rail 42 is beneficial with the arrangements of FIGS. 7 and 8, whereas in FIGS. 9 and 10, a particular mounting position is required in order that the screen be properly received within recess 41.

The extent to which the thin profile display monitor is movable forward of the screen is a function of the length of the arms. Typically, a forward position 12 to 18 inches in front of the panel is sufficient, however, this limitation can change according to the particular application.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. In an office panelling system having a number of interconnected panels used to subdivide an office space with the panels being less than 5 inches in thickness, an adjustably mounted flat electronic display having an adjustable securing arm secured to a mounting rail of one of said panels, said adjustable securing arm accommodating variable positioning of said display screen in front of the panel to which the securing arm is attached, said securing arm and display screen being movable from a storage position with said display screen generally flat against said panel to a forward operating position in front of and variably separated from said panel.

2. In an office panelling system as claimed in claim 1 wherein said securing arm is a bifolded arm hingedly attached at said panel and hingedly attached at said display screen.

3. In an office panelling system as claimed in claim 1 wherein said securing arm is attached to a horizontal rail of said panel exposed between decorative elements of said panel and wherein said securing arm is slidable along said horizontal rail.

4. In an office panelling system as claimed in claim 1 wherein said panel includes a recessed area for at least partially accommodating said display screen when said display screen is in the storage position.

5. In an office panelling system as claimed in claim 1 wherein said display screen is movable to a forward position at least 12 inches in front of said panel.

6. In an office panelling system having a multiplicity of discrete office panels interconnected to subdivide an open area in a particular manner and a work surface immediately in front of one of said panels, said one panel and said work surface cooperating to define a work station including a thin profile display monitor and a keyboard, said display monitor being supported in a cantilevered manner by an adjustable securing arm attached adjacent said panel above said work surface, said securing arm and said screen cooperating to position said screen at any position between a storage position adjacent said panel to a forward position in front of said panel and above said work surface whereby an operator may freely adjust the position of said display monitor to a desired operating position and return the display monitor to a storage position immediately adjacent the panel to allow additional work surface utilization for other tasks when said display monitor is in the storage position.

7. In an office panelling system as claimed in claim 6 wherein said adjustable securing arm is a bifolded arm with a first arm hingedly attached at said panel and a second arm hingedly attached at said display screen, with said first and second arms being hingedly secured to form said bifolded arm.

8. An adjustably mounted electronic display screen arrangement comprising:
   an office panel less than 5 inches thick,
   a flat, thin profile electronic display screen,
   an adjustable securing arm, and
   a horizontally extending mounting rail forming part of said office panel;
   said flat electronic display screen being mounted at one end of said adjustable securing arm with an opposite end of said securing arm being slidably secured for horizontal sliding movement along said horizontally extending mounting rail,
   said adjustable securing arm adjacent said mounting rail having a hinge arrangement having a vertical hinge axis,
   said adjustable securing arm adjacent said flat electronic display screen including a hinge arrangement having a vertical hinge axis with said flat electronic display screen pivotally movable about said hinge axis,
   said flat electronic display screen being movable from a storage position immediately adjacent and flat against said office panel to an in use position in front of and spaced from said panel by said securing arm,
   said securing arm in said storage position being generally parallel with the front of said office panel, with said securing arm being at an angle to the front of said office panel when said flat electronic display screen is in an in use position,
   said in use position being variable by pivotting of said securing arm about said hinge axis adjacent said mounting rail.

9. An adjustably mounted display screen arrangement as claimed in claim 8 wherein said securing arm is a bifolded securing arm foldable upon itself centrally and said securing arm is generally flat against said office panel when said flat electronic display screen is in the storage position.

10. An adjustably mounted display screen arrangement as claimed in claim 9 wherein said securing arm is made of flat plate vertically orientated such that the flat plate can fold against said office panel.

11. An adjustably mounted display screen as claimed in claim 10 wherein said horizontal rail is exposed between decorative elements of said panel.

12. An adjustably mounted display screen as claimed in claim 8 wherein said panel includes decorative cover elements on the face thereof and a recess is provided in said decorative cover elements for partially accommodating said display screen within the thickness of said panel when said display screen is in the storage position.

13. An adjustably mounted display screen arrangement as claimed in claim 8 wherein said display screen is movable to an in use position at least 12 inches in front of said panel.

* * * * *